May 20, 1941.  C. C. COONS  2,242,814
REFRIGERATION
Filed Jan. 3, 1938
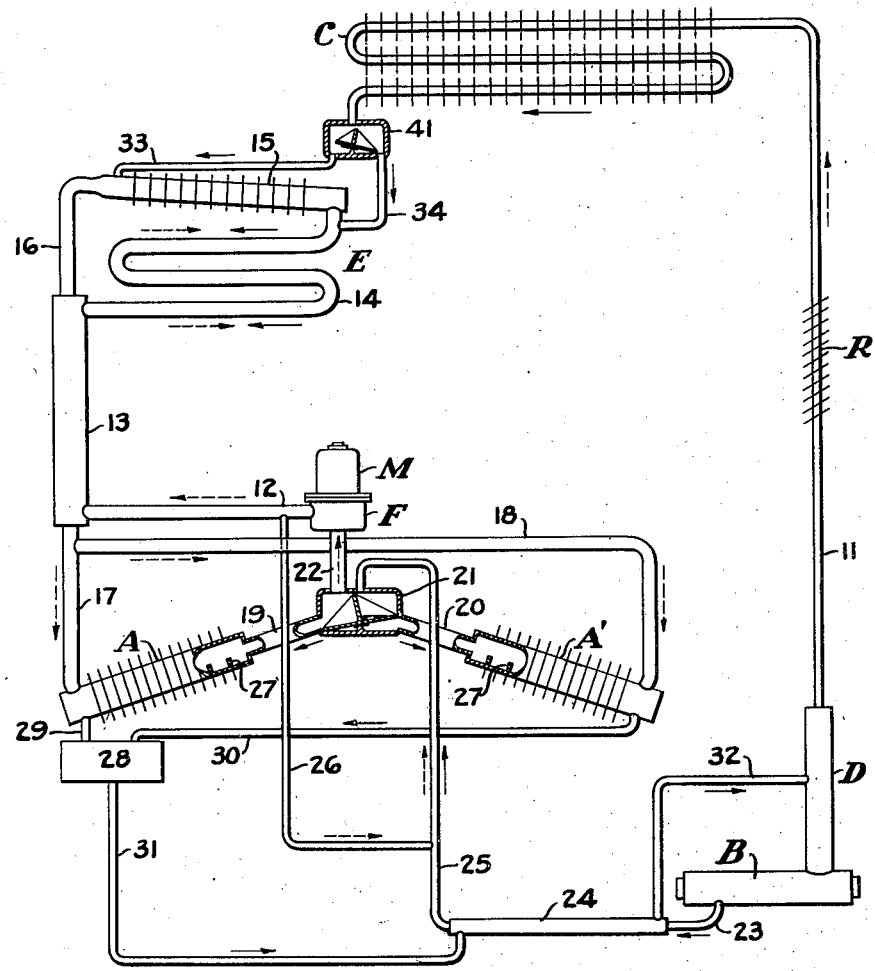
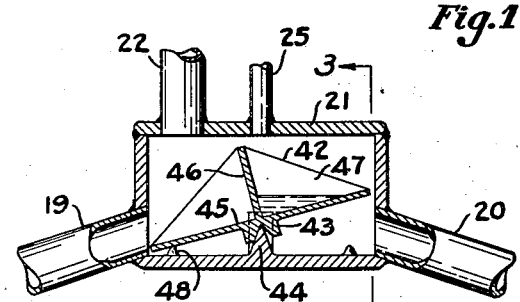
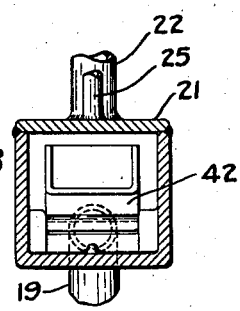
Fig.1
Fig.2
Fig.3
INVENTOR
*Curtis C. Coons*
BY
*Harry S. Demasse*
ATTORNEY Patented May 20, 1941

2,242,814

UNITED STATES PATENT OFFICE 2,242,814

REFRIGERATION

Curtis C. Coons, North Canton, Ohio, assignor to The Hoover Company, North Canton, Ohio, a corporation of Ohio Application January 3, 1938, Serial No. 183,001

20 Claims. (Cl. 62—119.5)

This application relates to refrigerating systems and more particularly to flow regulating devices for absorption refrigerating systems.

It has been found desirable in absorption refrigerating systems, particularly air-cooled absorption refrigerating systems, to form the absorber into a plurality of sections connected in parallel. The great objection to this system is that it is difficult to proportion the absorption solution properly between the two absorber sections. A multiple section absorber has the great advantage of providing a relatively greater ratio of low temperature to high temperature heat rejecting area than is practical with a single absorber. Also a greater heat rejecting area for a given gas and liquid contact area is provided by a multiple section absorber than is provided by a single absorber. Also a multiple section absorber is structurally more flexible and is more readily adapted to the rigid space limitations of domestic refrigerating cabinets.

It has been customary heretofore in absorption refrigerating systems to supply the liquid refrigerant to the upper portion of the evaporator through which it flows downwardly by gravity. These systems have the disadvantage that too much liquid is supplied to the top portion of the evaporator, which customarily forms a box-cooling section, whereby proper distribution of the refrigerating effect between the box-cooling and low temperature sections of the evaporator has not been achieved. Some structures provide dual condenser evaporator units, but this is a complex and costly arrangement, and the devision of refrigerant between the various evaporator sections is not certain and is greatly affected by variations in condensing conditions.

According to the present invention, reliable division of the absorption solution between the absorber sections is assured, and the liquid refrigerant is proportionally divided between the box-cooling and low temperature evaporator sections. Thus, there is provided a refrigerating system wherein the various evaporator sections are properly supplied with liquid refrigerant, and the absorber includes a plurality of air-cooled sections, each of which is provided with its proportionate share of absorption solution.

Other and further objects of the invention will become apparent as the description proceeds when taken in connection with the accompanying drawing, in which:

Figure 1 is a diagrammatic representation of a refrigerating system embodying my invention.

Figure 2 is a sectional view of a detail on an enlarged scale.

Figure 3 is a sectional view taken along the line 3—3 of Figure 2 and looking in the direction of the arrows.

I have elected to disclose my invention as being applied to a continuous three-fluid refrigerating system but it is also well adapted to other types of circulatory systems.

Referring to the drawing, it will be seen that I have illustrated diagrammatically a continuous three-fluid refrigerating system comprising a boiler B, an analyzer D, a rectifier R, a condenser C, an evaporator E, a pair of absorbers A and A', and a pressure equalizing medium circulating fan F driven by a motor M. These elements are suitably interconnected by various conduits to provide a plurality of gas and liquid circuits constituting a complete refrigerating system.

It will be understood that the system is suitably charged with a refrigerant such as ammonia, an absorbent such as water, and a pressure equalizing medium, preferably a dense inert gas such as nitrogen.

The boiler B is heated by any suitable means such as a gas burner or an electrical cartridge heater and the circulating motor M is energized from any suitable source of electrical energy. The current for the motor M and the source of heat for the boiler are controlled in any desired manner. A preferred control mechanism is illustrated in the co-pending application of Curtis C. Coons, filed June 17, 1937, Serial No. 148,424.

Application of heat to the boiler B liberates refrigerant vapor from the solution therein contained. The refrigerant vapor passes upwardly through the analyzer D in counterflow relationship to strong absorption solution flowing downwardly through the analyzer. Absorption solution vapor, generated in the boiler B, condenses in the analyzer D, the heat of condensation serving to liberate refrigerant vapor from the strong solution. The refrigerant vapor passes from the analyzer D into the condenser C by way of a conduit 11 which includes an air-cooled rectifier R which condenses any vapor of absorption solution which may pass through the analyzer.

The evaporator E and the absorber sections A and A' are included in a pressure equalizing medium circuit. Pressure equalizing medium is discharged under pressure by the fan F through a conduit 12 into the outer pass of a gas heat exchanger 13. The inert gas passes from the outer pass of the gas heat exchanger 13 into the bottom of the low temperature section 14 of the evaporator E, through the box-cooling section 15 of the evaporator E and through the conduit 16 into the inner pass of the gas heat exchanger 13. The pressure equalizing medium leaving the inner pass of the gas heat exchanger divides into two streams which are conducted through the conduits 17 and 18 into the bottom portion of the absorber sections A and A', respectively. The pressure equalizing medium travels upwardly through the absorber sections A and A' and through conduits 19 and 20, respectively, into a solution diversion chamber 21. Pressure equalizing medium is returned from the chamber 21 to the suction inlet of the fan F through a conduit 22.

The weak solution formed in the boiler B is withdrawn therefrom through a conduit 23, a liquid heat exchanger 24, and a conduit 25 which opens into the top portion of the diversion chamber 21. The liquid supplied through the conduit 25 must be elevated up to the level of the chamber 21 which is at an elevation appreciably higher than that of the liquid level normally standing in the boiler-analyzer system. For this purpose, a gas bleed-off conduit 26 is connected between the fan discharge conduit 12 and the weak solution conduit 25 below the liquid level in the boiler-analyzer system whereby the weak solution is elevated into the diversion chamber by gas lift action.

For the present it is sufficient to say that the weak solution supplied to the chamber 21 is alternately discharged into the absorber sections A and A' through the conduits 19 and 20, respectively. The exact mechanism by which this is accomplished will be described in detail hereinafter. The absorption solution flows downwardly through the absorber sections in counterflow relationship to the strong gas flowing upwardly therethrough. The refrigerant vapor content of the pressure equalizing medium stream is absorbed in the solution which collects in the bottom portion of the absorbers. The absorbers are air-cooled preferably by being externally finned and are internally baffled in any suitable manner; the baffling means are diagrammatically illustrated at 27. The strong absorption solution collecting in the lower ends of the absorber sections A and A' is conveyed therefrom into a reservoir 28 by conduits 29 and 30, respectively. The strong solution is conveyed from the reservoir 28 into the liquid heat exchanger 24 by way of a conduit 31. The strong solution is conveyed from the liquid heat exchanger 24 into the upper portion of the analyzer D by a conduit 32.

The refrigerant vapor supplied to the condenser C is liquefied therein preferably by heat exchange with the surrounding air and is discharged therefrom into a diversion chamber 41. The liquid refrigerant supplied to the chamber 41 is divided therein into two unequal streams by a mechanism to be described more fully hereinafter. For the present it is sufficient to note that the smaller stream is conveyed through a conduit 33 into that portion of the box-cooling conduit 15 adjacent the rich gas return conduit 16. The other stream of liquid refrigerant is discharged through a conduit 34 into the upper or gas outlet portion of the low temperature evaporator section 14. The liquid refrigerant supplied to the evaporator evaporates into the propelled inert gas stream to produce refrigeration, the resulting refrigerant vapor being conveyed with the inert gas stream into the absorbers in the manner previously described.

Referring now to Figure 2, it will be seen that the diversion device comprises a diversion chamber 21 and a tiltable divider 42 provided with a notch-forming element 43 mounted upon a knife edge 44 which is rigid with the bottom wall of the chamber 21. The element 42 includes a bottom wall 45, a central upstanding dividing wall 46, and a pair of side walls 47, only one of which is shown, which divide the device 42 into a pair of liquid receiving buckets. The device is arranged so that the neutral or balanced position of the upstanding wall 46 will be directly beneath the solution inlet conduit 25. The arrangement is such that liquid discharging through the conduit 25 falls to one side or the other of the partition member 46 and collects liquid in one of the buckets until the diversion element 42 becomes over-balanced whereupon it will pivot about the knife edge 44 and discharge the accumulated liquid into one of the conduits, 19 or 20, leading to one of the absorber sections. Pivotal movement of the diverter 42 will bring the other bucket into position to receive liquid discharged through the conduit 25 and the process will be repeated. A pair of stop elements may be formed on the bottom wall of the chamber 21 to limit downward movement of the diversion element 42, if desired.

The diversion element 41 is substantially identical with the diversion element 21 with the single exception that the capacity of the liquid collecting element which discharges into the box-cooling section 15 of the evaporator is substantially less than the capacity of the liquid collecting element which discharges into the low temperature section of the evaporator whereby the liquid refrigerant is unequally divided between the evaporator sections.

Thus it will be seen that I have devised a refrigerating system characterized in that the absorber is in two sections which are alternately operable. This has the advantage that the baffles 27 may be so designed as to permit only a relatively slow traverse of the absorber sections by the absorption solution whereby to insure efficient heat rejection and prolong gas and liquid contact for purposes of absorption.

The diversion device contained in the casing 41 is so arranged that only sufficient liquid refrigerant is supplied to the box-cooling section 15 to maintain the refrigerating cabinet within safe temperature limits but without undue formation of frost or condensed moisture upon the conduit 15. It is apparent from the arrangement illustrated that when liquid is supplied to the box-cooling conduit 15, liquid previously supplied to the evaporator section 14 is partially vaporized wherefor relatively lean inert gas is supplied to the conduit 15 to insure efficient evaporation therein.

While only one embodiment of the invention has been illustrated and described, it is to be understood that the invention is capable of expression in numerous other constructional forms and variations without departing from the spirit of the invention or the scope of the appended claims.

I claim:

1. Absorption refrigerating apparatus comprising a pressure equalizing medium circuit including an evaporator and a pair of absorbers, a solution circuit including a boiler and said absorbers, means for liquefying refrigerant vapor generated in said boiler, means for propelling a pressure equalizer medium through said circuit and upwardly through said evaporator and absorbers, means diverting a portion of said pressure equalizing medium under pressure and injecting the same into a body of lean solution leaving said boiler whereby to raise the liquid to the level of the top portions of said absorbers, means operative alternately to discharge said solution into said absorber sections, said evaporator including a high temperature cabinet-cooling section and a low temperature freezing section, and means operative alternately to supply unequal portions of said liquid refrigerant to said evaporator sections.

2. Refrigerating apparatus comprising a pressure equalizing medium circuit including an evaporator and a pair of absorbers, a solution circuit including a boiler and said absorbers, means for supplying refrigerant vapor generated in said boiler to said evaporator in liquid form, and means operative to divert weak solution leaving said boiler alternately into said absorbers.

3. Absorption refrigerating apparatus comprising a pressure equalizing medium circuit including an evaporator and an absorber, a solution circuit including a boiler and said absorber, means for supplying to said evaporator in liquid form refrigerant vapor generated in said boiler, said evaporator comprising a serially connected cabinet-cooling section and a freezing section, and means alternately operative to divert unequal portions of said liquid refrigerant into the pressure equalizing medium outlet portions of said cabinet-cooling and freezing sections of said evaporator.

4. Refrigerating apparatus comprising an evaporator including serially connected vertically spaced high and low temperature sections, means for propelling a pressure equalizing medium upwardly through said evaporator sections, and means alternately supplying a relatively small quantity of liquid refrigerant to the gas outlet portion of said high temperature evaporator section and supplying a relatively large quantity of liquid refrigerant to the gas outlet portion of said low temperature evaporator section.

5. Absorption refrigerating apparatus including a boiler, an evaporator, and a plurality of absorber elements, power-driven means for propelling a dense inert gas upwardly through said evaporator and upwardly through said absorber sections, means for condensing and supplying to said evaporator refrigerant vapor generated in said boiler, means for conveying weak solution from said boiler to a level above the upper portions of said absorbers, means for conveying strong solution from said absorbers to said boiler, and means operative alternately to divert said weak solution from said boiler into said absorber sections.

6. Refrigerating apparatus including a boiler, a pair of absorbers, means for propelling a pressure equalizing medium upwardly through said absorbers, a gas lift pump operated by a propelled stream of pressure equalizing medium to elevate weak solution to a point above said absorbers, means for alternately discharging bodies of solution so elevated into each of said absorbers, and means for retarding flow of solution through said absorbers.

7. Refrigerating apparatus including an evaporator including box-cooling and ice-freezing sections, a diverter including a large capacity bucket and a small capacity bucket, means for supplying liquid refrigerant to said diverter, the arrangement being such that liquid is alternately discharged from said buckets, and means for conveying the liquid discharged from said small and large capacity buckets into said box-cooling and ice-freezing evaporator sections respectively.

8. That improvement in the art of refrigeration which includes the steps of flowing a pressure equalizing medium serially through a plurality of evaporating zones, condensing refrigerant vapor to liquid phase, supplying a portion of the liquid to one of said zones while accumulating another portion of the liquid, and supplying the accumulated liquid to the other of said zones while accumulating liquid for said one zone.

9. That improvement in the art of refrigeration which includes the steps of flowing a pressure equalizing medium serially through a plurality of evaporating zones, condensing refrigerant vapor to liquid phase, supplying a relatively small quantity of the liquid to one of said zones while accumulating another relatively large quantity of the liquid, and supplying the accumulated liquid to the other of said zones while accumulating liquid for said one zone.

10. That improvement in the art of refrigeration which includes the steps of causing a pressure equalizing medium to flow upwardly through a plurality of absorbing zones, generating weak absorbing solution, supplying a portion of the solution to one of said zones while accumulating another portion of the solution in the presence of pressure equalizing medium discharged from said one zone, supplying the accumulated solution to the other of said zones while accumulating liquid for subsequent supply to said one zone in the presence of pressure equalizing medium discharged from said other zone.

11. Refrigerating apparatus comprising a pressure equalizing medium circuit including an evaporator and a pair of absorbers, a solution circuit including a boiler and said absorbers, means for supplying refrigerant vapor generated in said boiler to said evaporator in liquid form, a gas lift pump for elevating absorption solution from said boiler to said absorbers, and means operative to divert weak solution so elevated into said absorbers alternately.

12. Refrigerating apparatus comprising a pressure equalizing medium circuit including an evaporator and a pair of absorbers, a solution circuit including a boiler and said absorbers, means for supplying refrigerant vapor generated in said boiler to said evaporator in liquid form, and gravity actuated means operative to divert weak solution leaving said boiler into said absorbers alternately.

13. Refrigerating apparatus comprising an evaporator, a solution circuit including a pair of absorbers and a boiler, means for supplying vapor generated in said boiler to said evaporator in liquid phase, means for conveying refrigerant vapor from said evaporator to said absorber, and a tilting bucket arranged to discharge weak solution alternately into each of said absorbers.

14. Absorption refrigerating apparatus comprising an inert gas circuit including a pair of evaporators and a pair of absorbers, a solution circuit including said absorbers and a boiler, means for liquefying refrigerant vapor produced in said boiler, means for alternately discharging liquid refrigerant into said evaporators, means for circulating solution through said solution circuit, and means in said solution circuit for alternately discharging absorption solution into said absorbers.

15. Absorption refrigerating apparatus comprising an inert gas circuit including a pair of serially connected evaporators and a pair of parallel connected absorbers, a solution circuit including a boiler and said absorbers, means for liquefying refrigerant vapor produced in said boiler and for supplying unequal quantities thereof to said evaporators alternately, means for circulating solution through said solution circuit, and means for alternately discharging absorption solution into said absorbers.

16. Absorption refrigerating apparatus comprising a plurality of vessels connected to form overlapping inert gas, absorption liquid and refrigerant liquid circuits, means for circulating the inert gas and absorption liquid through their respective circuits, one of said circuits including a vessel arranged to receive liquid and inert gas and having a pair of parts, and means operative to discharge liquid into said parts alternately.

17. Absorption refrigerating apparatus comprising a plurality of vessels connected to form overlapping inert gas, absorption liquid, and refrigerant liquid circuits, means for circulating the inert gas and absorption liquid through their respective circuits, one of said circuits including a vessel arranged to receive liquid and inert gas and having a pair of parts, and means operative to discharge unequal quantities of liquid into said parts alternately.

18. In combination, absorption refrigeration apparatus including a boiler assembly, an evaporator, and an absorber assembly, conduits interconnecting said evaporator and absorber assembly and providing an inert medium circuit therewith, conduits interconnecting said boiler assembly and said absorber assembly and providing an absorption solution circuit therewith, said absorber assembly including means providing a plurality of absorption liquid passages therethrough, means for circulating absorption solution in the absorption solution circuit, and movable means operable by said solution circulation for directing one part of said circulating solution to one of said absorber solution passages and for directing another portion of said solution to another of said absorber solution passages.

19. In combination, an absorption refrigeration apparatus including a generator, a refrigerant liquefier, an evaporator, and an absorber, conduits interconnecting said generator, liquefier, evaporator and absorber in circuit and providing an inert medium circuit between said evaporator and absorber and an absorption solution circuit between said generator and absorber, means for circulating absorption solution through said solution circuit, means for circulating an inert medium through said inert medium circuit, means for conveying refrigerant liquid from said liquefier to said evaporator, and movable means operable as the result of flowing liquid refrigerant in said last named means to direct one portion of said liquid refrigerant to one part of said evaporator and another portion of said liquid refrigerant to another part of said evaporator.

20. The combination set forth in the preceding claim characterized by the fact that said liquid refrigerant directing means is constructed and arranged to direct a greater proportion of liquid refrigerant to one part of said evaporator than to another part thereof.

CURTIS C. COONS.